United States Patent Office 2,755,271
Patented July 17, 1956

2,755,271

TOUGH RIGID COMPOSITION OF NEOPRENE AND VINYL CHLORIDE POLYMER

Pliny O. Tawney, Passaic, and Robert H. Snyder, Newark, N. J., assignors to United States Rubber Company, New York, N. Y., a corporation of New Jersey No Drawing. Application November 19, 1952, Serial No. 321,522

4 Claims. (Cl. 260—45.5)

This invention relates to improved thermoplastic compositions which are rigid and yet have a high impact strength, and more particularly it relates to thermoplastic compositions made by blending vinyl chloride polymers with relatively small amounts of neoprene.

The ordinary polyvinyl chloride of commerce is a hard, rigid, chemically resistant, thermoplastic polymer which has come into widespread use in a large variety of applications because of its desirable combination of physical properties. However, the material has one major disadvantage, namely, relatively poor impact resistance, which precludes its successful use in fabricating rigid articles that must withstand blows in normal usage. When polyvinyl chloride is compounded with relatively large amounts of soluble plasticizers (e. g., 50–100 parts of plasticizer per 100 parts of polyvinyl chloride) the resulting products are flexible, soft materials suitable for forming films and the like, but the making of hard, rigid articles therefrom is entirely precluded.

One object of the present invention is to compound polyvinyl chloride in such a way as to retain its rigidity, hardness and flexural strength while raising its impact strength significantly.

Another object of the invention is to produce improved polyvinyl chloride compositions capable of being fabricated into non-brittle, tough, rigid articles, which substantially retain the excellent chemical resistance and resistance to heat distortion which are characteristic of the polyvinyl chloride itself.

According to the invention, a major amount of a vinyl chloride polymer is compounded with a minor amount of neoprene. This combination of materials has most unexpectedly been found to result in a great improvement in the impact strength. Furthermore, in these mixtures the unexpected improvement in impact strength is obtainable without reducing the rigidity significantly. The invention therefore provides improved vinyl chloride polymer compositions which are rigid but non-brittle, and are therefore adapted to formation of rigid sheets or films, or other articles capable of rendering excellent service, even in applications where polyvinyl chloride has heretofore been considered totally unsuited.

The vinyl chloride polymer used in the invention may be either polyvinyl chloride itself (i. e., the ordinary polyvinyl chloride of commerce), or a copolymer of vinyl chloride with another copolymerizable monomer (usually in amount of at least 1%), that is usually a monoethylenically unsaturated material, such as vinyl acetate or vinylidene chloride. These polymeric materials will be designated generally as vinyl chloride polymers.

As is well known to those skilled in the art, the term "neoprene" refers to the synthetic elastomer produced by polymerization of 2-chlorobutadiene-1,3, also called polychloroprene rubber.

The compositions of the invention contain, in 100 parts thereof, from about 3 parts to about 35 parts by weight of neoprene, and correspondingly from about 97 parts to about 65 parts of the vinyl chloride polymer. Compositions containing less than 3 parts of the neoprene do not show a satisfactory improvement in impact strength. On the other hand, it is found that compositions containing more than about 35 parts of the neoprene have very low tensile strength, low rigidity, and low tear resistance, as well as a very poor physical appearance characterized by excessive lumpiness. They are of no value in making rigid articles of high impact strength. The preferred compositions contain from about 5 parts to about 20 parts of neoprene in 100 parts of the mixture of neoprene and vinyl chloride polymer.

The mixtures can be molded, calendered, extruded, or otherwise fabricated into articles of the desired shape, by the machinery and methods conventionally used in making plastic articles. The mixtures are most useful in fabricating articles which need high impact strength in combination with rigidity, e. g., rigid sheets, rods, and many other molded, extruded or expanded articles. The new compositions are especially useful in making rigid pipe which is much lighter in weight than metal pipe.

The compositions of the invention are prepared by intimately mixing the vinyl chloride polymer and the neoprene together. Usually, the two materials are mixed together in the solid form by means of a mixing machine of the type normally used for mixing rubber or plastics, e. g., a roll mill or a Banbury mixer. It is also possible to mix the two ingredients in dispersed form, that is, the latices of the vinyl chloride polymer and the neoprene may be mixed together and then coagulated to yield the desired blend. If desired, one of the materials in solid form, e. g., polyvinyl chloride powder, may be dispersed in a latex of the other, the mixture thereafter being dried. The materials may also be dissolved separately in a suitable organic solvent, the solutions mixed, and the solvent removed by evaporation or other means. The compositions may be modified by the addition of optional ingredients, such as fillers, dyes, pigments, stabilizers, or other materials having no adverse effect on the impact strength. However, regardless of the method of mixing the two materials, it is necessary to heat the mixture at some stage to a temperature above that at which the vinyl chloride polymer fuses, in order to obtain an adequately intimate combination of the materials. Temperatures within the range of about 250°–300° F. are generally adequate for this purpose. Without such heating, the vinyl chloride polymer will persist as discrete particles in the mixture, and the desired physical properties will not be obtained. This heating is most conveniently done during mixing on the mill or in the Banbury, or during the final molding. A stabilizer is preferably added to the mixture before heating in order to minimize the splitting off of hydrogen chloride, and to neutralize any hydrogen chloride which does evolve. Hydrous tribasic lead sulfate, a typical stabilizer for polyvinyl chloride, is an example of a suitable stabilizer.

The toughening effect of the neoprene used in our vinyl chloride polymer composition differs radically from the softening or plasticizing effect of conventional "plasticizers" in that adequate rigidity of the composition is retained and the impact strength is greatly increased, whereas plasticizers markedly reduce the rigidity and do not impart high impact strength. Thus, in a typical embodiment of the invention, the impact strength can be raised from a value for the vinyl chloride polymer itself of about 0.8 foot-pound per inch of notch (Izod) to a value for the blend of up to about 6 foot-pounds without reducing the rigidity below practical limits. In all cases, the blends of the invention have an impact strength at least twice that of the vinyl chloride polymer itself, or an Izod impact strength of at least 1.6 foot-pounds per inch of notch.

The rigidity or flexibility is generally expressed in terms of the flexural modulus. Polyvinyl chloride itself has a flexural modulus at 25° C. of about 400,000 pounds per square inch. In general, it may be stated that materials having a flexural modulus of at least 100,000 p. s. i. are sufficiently stiff to be employed in the usual applications requiring a rigid material. However, it is preferred to use materials having a flexural modulus of at least 150,000 p. s. i. in fabricating rigid articles. The preferred compositions of the invention are therefore those having a flexural modulus of at least 150,000 p. s. i. The values recorded in the examples herein are the actual measured values times $10^{-3}$. These compositions also have an impact strength of at least twice that of the vinyl chloride polymer itself, and usually very much higher. The compositions having these physical properties are those containing about 3 to 35 parts of the neoprene rubber in 100 parts of combined vinyl chloride polymer and rubber.

The polyvinyl chloride used in the invention is typified by the commercially available resins known as the Marvinols, e. g., Marvinol VR–10 and Marvinol VR–20. Marvinol VR–10 is used where high heat stability is desired during processing, as in slush molding or in the extrusion of pipe. Its specific viscosity (in a solution of 0.4 g. in 100 cc. of nitrobenzene) at 30° C. is 0.55. Marvinol VR–20 is a general purpose resin used in coated fabrics, unsupported film, electrical insulation, etc. Its specific viscosity, measured in the same way, is 0.38. Other polyvinyl chloride resins which are operable in our invention are exemplified by the commercially available grades marketed under such trade names as Geon 121, Geon 101, Geon 101–EP and Vinylite QYNA. The vinyl chloride:vinyl acetate copolymers used are exemplified by various commercially available resins known at Vinylites, especially those ranging in composition from about 85% to 96% of vinyl chloride and correspondingly from about 15% to 4% of vinyl acetate. Certain of the Vinylites, e. g., VAGH and VMCH, which have a ratio of vinyl chloride to vinyl acetate falling within these preferred limits also contain, according to the manufacturer, small amounts of other materials. These Vinylites are operable in our invention, and our use of the term "vinyl chloride:vinyl acetate copolymers" is understood to include them. The copolymer may contain as little as 1% of vinyl acetate.

The vinyl chloride:vinylidene chloride copolymers used contain from 1% up to 99% of vinylidene chloride. Vinyl chloride:vinylidene chloride copolymers are sometimes called carans.

The following example illustrates our invention in more detail. All compositions are given in parts by weight.

*Example*

The following stocks B and C were made by blending Marvinol VR–10 and neoprene on a mill at 300–310° F., i. e., above the fusion temperature of the Marvinol, followed by molding the blends at 338° F. for 10 minutes under pressure. Stock A, which consists of Marvinol only and is shown for contrast with the stocks (B and C) exemplifying our invention, was milled and molded in like manner.

| Stock | A | B | C |
|---|---|---|---|
| Marvinol VR–10 (parts by weight) | 100 | 90 | 85 |
| Neoprene (parts by weight) | | 10 | 15 |
| Izod impact strength (ft.-lbs./in. of notch) | 0.8 | 5.2 | 5.4 |
| Flexural modulus at 25° C. (Thousands of p. s. i.) | 440 | 340 | 293 |

When stocks B and C were bent slowly through an angle of 30°, they turned white permanently at the bend. When stock A was bent in the same way, it did not turn white.

The example shows that the inclusion of the neoprene in the compositions effects a very considerable improvement in their impact strength over that of Marvinol, while their rigidity is still adequate.

In like manner the blending of neoprene separately with copolymers of vinyl chloride and vinyl acetate or with copolymers of vinyl chloride and vinylidene chloride effects similar improvements in impact strength of the blends over that of the respective copolymers alone.

The effect of conventional plasticizers on polyvinyl chloride and on polyvinyl chloride-neoprene blends is shown in the following experiments. The resin, neoprene and plasticizer were blended on the hot mill and molded as described in the example illustrating our invention.

| Stock | 1 | 2 | 3 | 4 | 5 |
|---|---|---|---|---|---|
| Marvinol VR–10 (parts by weight) | 100 | 90 | 90 | 90 | 85 |
| Neoprene | | | | 10 | 15 |
| Dioctyl phthalate | | 10 | | | |
| Tricresyl phosphate | | | 10 | | |
| Paraplex G–25 (polymerized alkyd ester) | | | | 5 | 5 |
| Flexural modulus | 440 | 392 | 430 | | |
| Impact strength | 0.8 | 0.5 | 0.4 | 0.7 | 0.9 |

These stocks were bent like stocks A–C. There was no whitening at the bend.

It is evident that the use of conventional plasticizers in an amount comparable to the amount of neoprene used in our invention decreases the already low impact strength of polyvinyl chloride, and that the beneficial effect of blending neoprene with polyvinyl chloride is nullified by the plasticizer.

The extraordinary improvement obtained by blending neoprene with the vinyl chloride polymers in accordance with the invention is particularly unexpected in view of the fact that these materials appear to be definitely incompatible with each other. Their incompatibility can frequently be shown by the lack of clarity of a solid film laid down by evaporation of a solution of these materials in a mutual solvent, even after the film has been dried and fused. Those skilled in the art would not expect to find improved physical properties in a mixture of materials that are basically incompatible. Evidently the unusual improvement in impact strength obtained in the present blends is in some manner connected with this incompatibility, because if the mixture includes significant amounts of a solvent-type plasticizer that has a mutual solubilizing effect on the ingredients, then the present improvement is not obtained, as shown. The phenomenon of whitening, exhibited when the compositions of our invention are bent, is also characteristic of them, and is never observed when solubilizing plasticizers are used. However, it is not desired to limit the invention to any particular theory of operation. At the same time, it must be emphasized that solvent-type plasticizers, whether of the volatile type like dioctyl phthalate, or of the non-volatile type like polymerized alkyd esters, definitely prevent the attainment of the improvements of the invention. Soluble plasticizers must therefore be excluded from the present blends. In this respect, the new materials of the invention are sharply distinguished from the homogeneous mixtures of polyvinyl chloride, neoprene and plasticizer disclosed in the Crawford Patent 2,278,833. In the mixtures shown in the Crawford patent, the plasticizer apparently exerts a mutual solubilizing action on the neoprene and the resin, with the result that the mixture evidently has a fundamentally different structure from that of the present mixtures. In any case, the solvent-type plasticizer in the Crawford mixtures prevents the attainment of the high impact strength characteristic of the blends of our invention, which are devoid of plasticizer.

From the foregoing, it will be apparent that our invention encompasses blends of vinyl chloride polymer and neoprene in certain proportions in the presence only of substances which have substantially no depressing effect on the impact strength of the blend, that is, the invention contemplates blending the vinyl chloride polymer and the neoprene in the absence of any other substances, such as solvent-type plasticizers, which would prevent the attainment of the improved impact strength of at least 1.6 foot-pounds. As indicated, the novel blends having such remarkably improved impact strength display the distinguishing characteristic of becoming opaque white in appearance in stressed produced by bending sharply a molded sample of the material. This phenomenon is not observed in vinyl chloride polymer compositions which are outside the scope of the invention and do not have the improved impact strength, whereas it is always observed in the improved vinyl chloride polymer blends prepared as described herein. When the whitening does not occur, the impact strength is invariably poor.

The blends of our invention may be substituted to great advantage for plastic compositions, or even for metals or other materials, in any applications where toughness is a requirement. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates and tumbling barrels for plating operations; electrical parts, such as terminal blocks, telephones, and protective casings for cable joints; as well as tote boxes and trays; luggage; radio cabinets; furniture; phonograph records; paneling or covering for interior and exterior walls and surfaces of buildings, railroad cars or ships; automobile parts such as steering wheels, door panels, and seat parts; roller skate wheels; protective equipment such as helmets, and armor, including body armor; printing plates; tools; die cutting blocks; washing machine parts such as bearings and impellers; and numerous other articles, as will be evident to those skilled in the art. The compositions of the invention may be expanded or blown to make cellular or sponge material. The blends may be laminated or otherwise reinforced, as with fibers or fabrics, if desired in making the foregoing or other articles, although frequently the strength of the blends will be adequate without reinforcement.

In practicing our invention, greatest emphasis must be placed upon the fact that the neoprene and vinyl chloride copolymer constitute the principal and essential ingredients, and any lesser ingredients, if they are present at all, should be of such character or should be present in such small amounts, that they do not have an appreciable depressing effect on the high impact strength otherwise obtainable by blending the principal ingredients. Thus, more or less of relatively inert or non-solubilizing materials such as fillers or pigments, or minor amounts of stabilizers and the like, can generally be present along with the principal ingredients without undue lowering of the impact strength level. However, the situation is entirely different in the case of solubilizing materials such as solvent plasticizers, since such materials can, if employed in appreciable amount (a few per cent or more), completely destroy the effect of the invention, as indicated previously.

Having thus described our invention, what we claim and desire to protect by Letters Patent is:

1. A rigid, unplasticized, thermoplastic composition characterized by an Izod impact strength of at least 1.6 foot-pounds per inch of notch, and a flexural modulus of at least 100,000 pounds per square inch, consisting essentially of an intimate binary fusion blend of from 5 to 20 parts of polychloroprene rubber and complementarily from 95 to 80 parts of a vinyl chloride polymer, said composition being further characterized by the fact that a molded sample thereof becomes white upon bending.

2. A composition as in claim 1, in which the said vinyl chloride polymer is polyvinyl chloride.

3. A composition as in claim 1, in which the said vinyl chloride polymer is a copolymer of from 85% to 99% of vinyl chloride with from 15% to 1% of vinyl acetate.

4. A composition as in claim 1, in which the said vinyl chloride polymer is a copolymer of from 1% to 99% of vinyl chloride with from 99% to 1% of vinylidene chloride.

References Cited in the file of this patent

UNITED STATES PATENTS

| | | |
|---|---|---|
| 2,278,833 | Crawford | April 7, 1942 |
| 2,624,682 | Hazeltine | Jan. 3, 1953 |
| 2,658,050 | Singer et al. | Nov. 3, 1953 |
| 2,658,051 | Singer et al. | Nov. 3, 1953 |
| 2,658,053 | Singer et al. | Nov. 3, 1953 |

FOREIGN PATENTS

| | | |
|---|---|---|
| 539,834 | Great Britain | Sept. 25, 1941 |
| 599,937 | Great Britain | Mar. 24, 1948 |
| 110,750 | Australia | June 13, 1940 |